United States Patent Office
3,451,050
Patented June 17, 1969

3,451,050
MEMORY SYSTEM FOR MACHINE CONTROL
Walter Heissmeier and Wolfgang Wagnerberger, Nuremberg, Germany, assignors to Siemens Aktiengesellschaft, Berlin, Germany, a corporation of Germany
Filed Oct. 28, 1966, Ser. No. 590,422
Claims priority, application Germany, Oct. 29, 1965, S 100,261
Int. Cl. G11b 5/00
U.S. Cl. 340—174.1                    8 Claims

ABSTRACT OF THE DISCLOSURE

A device for producing a plurality of identical items consisting of a magnetic memory upon which both the location and the operation performed to the first workpiece is recorded. Subsequent workpieces are operated upon in accordance with the data previously recorded.

---

The present invention relates to a memory system for machine control. More particularly, the invention relates to a memory system for the control of a machine for producing a plurality of identical items.

In controlling a machine for repeated operation in order to produce a plurality of identical items, a read-in head or heads records or stores a signal on a magnetic memory during the production of the first item by the machine for each operation and position of the machine. The succeeding plurality of items are produced by the machine under the control of the signals stored in the memory and provided by a read-out head or heads which reads out each signal stored in the memory during the production of the first item.

In prior art systems of the aforedescribed type, the memory, the read-in head and the read-out head are so positioned that in one condition, the read-in head and the read-out head are coplanarly positioned in a plane parallel to the direction of movement of the machine, and in another condition, the memory and the read-in and read-out heads are displaceable toward each other in such plane. A disadvantage of these systems is that when the second and succeeding items are produced, the chuck or other apparatus supporting the items must be displaced a distance equal to that between the read-in and read-out heads. This gives rise to various errors in the operation of the machine and the production of the items.

The principal object of the present invention is to provide a new and improved memory system for machine control. The memory system of the present invention obviates the disadvantages of the prior art systems and operates with efficiency, effectiveness and reliability in controlling the operation of the machine. The memory system of the present invention is of simple structure and is economical in production. The memory system of the present invention eliminates the need to move the item-supporting apparatus as required in the systems of the prior art.

In accordance with the present invention, a memory system for controlling a machine having a stationary portion and a movable portion comprises a magnetic memory movably mounted on the stationary portion of the machine. A head support is affixed to the movable portion of the machine and is movable with such movable portion. A read-in head is mounted on the head support in operative proximity with the magnetic memory. A read-out head is mounted on the head support in spaced relation from the read-in head in operative proximity with the magnetic memory. The read-in and read-out heads are positioned in a plane perpendicular to the direction of movement of the movable portion of the machine and the magnetic memory is movable relative to the read-in and read-out heads in such plane.

The read-out head may comprise a Hall device. The magnetic memory may comprise a substantially cylindrical drum rotatably mounted on the stationary portion of the machine for rotation about an axis parallel to the direction of movement of the movable portion of the machine. The magnetic memory may, on the other hand, comprise a substantially planar plate movably mounted on the stationary portion of the machine for movement in a plane perpendicular to the direction of movement of the movable portion of the machine.

In accordance with the present invention, a method for controlling a machine having a stationary portion and a movable portion comprises the steps of storing magnetic signals corresponding to operation and position of the machine in a line parallel to the direction of movement of the movable portion of the machine in a magnetic memory movably affixed to the stationary portion of the machine; moving the magnetic memory relative to the stationary portion of the machine and in a plane perpendicular to the direction of movement of the movable portion of the machine upon completion of a first cycle of operation of the machine to change the distance of the line from the machine; and reading-out the magnetic signals from the line of the magnetic memory for a second and successive cycles of operation of the machine.

In order that the present invention may be readily carried into effect, it will now be described with reference to the accompanying drawing, wherein.

Figure 1:
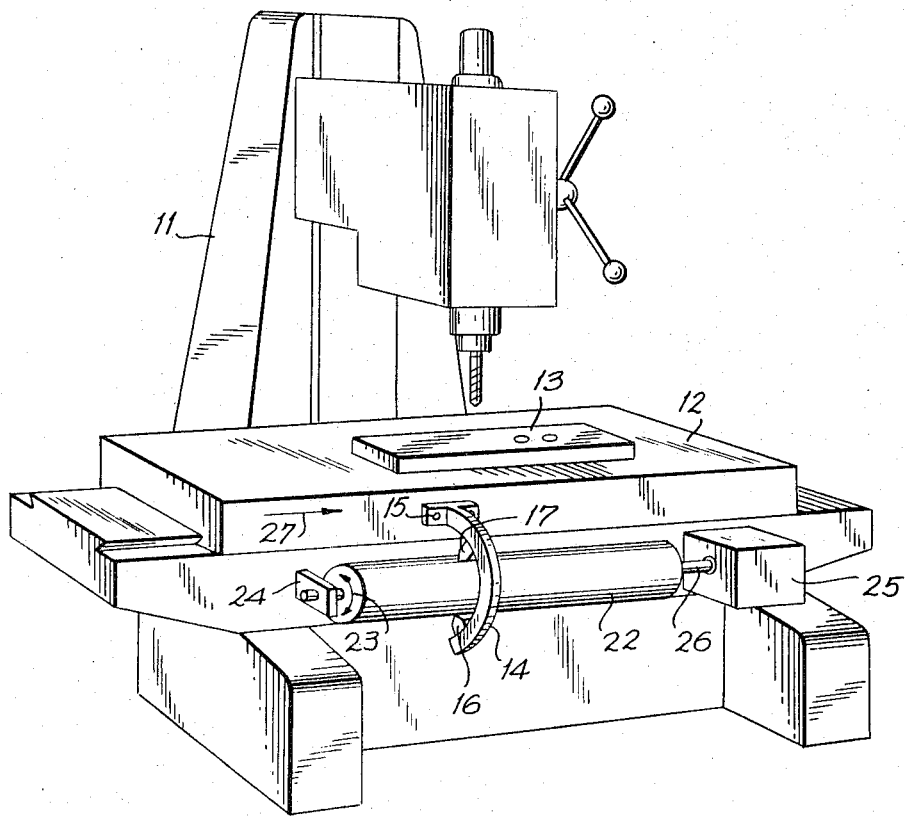
FIG. 1 is a perspective view of an embodiment of the memory system of the present invention mounted on a machine which it controls.

In FIG. 1, a boring machine 11 comprises a movable work platform 12 which supports an item or workpiece 13. The item 13 may be removably affixed to the work platform 12 by any suitable fastening means, not shown in FIG. 1.

A head support 14 is affixed to the work platform 12 by any suitable fastening means such as, for example, flanges 15 thereof. The head support 14 is of curvilinear configuration, preferably semiannular configuration, and supports a read-in head 16 and a read-out head 17 in spaced relation with each other.

Figure 2:
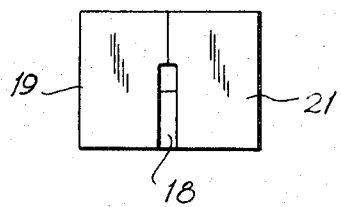
FIG. 2 is a view of an embodiment of a read-out head comprising a Hall device.

The read-in head 16 may comprise any suitable electromagnetic transducer and the read-out head 17 may comprise any suitable magneto-electric transducer. A preferred embodiment of read-out head 17 comprises a Hall device or plate 18 positioned between a pair of ferrite plates 19 and 21, as shown in FIG. 2.

The read-in and read-out heads 16 and 17 are positioned in operative proximity with a magnetic memory 22. The magnetic memory 22 is of elongated cylindrical or drum configuration and may comprise any suitable magnetic memory or storage material. The magnetic memory 22 is mounted on the machine 11 for rotation about its axis in either direction, as indicated by an arrow 23.

The memory 22 is mounted on the machine 11 by any suitable mounting means such as, for example, a pair of arm supports 24 and 25 affixed to said machine at the opposite ends of said memory and rotatably supporting said memory via a coaxially extending shaft 26. One of the arm supports such as, for example, the arm support 25, may include any suitable driving means for rotating the memory in either the clockwise or the counterclockwise direction about its axis.

The work platform 12 of the machine 11 is moved in the direction of an arrow 27, during the operation of the machine. The read-in head 16 records or stores a signal in the memory 22 during the production of the first item 13 by the machine 11 for each operation and position of said machine. The head support 14, and thus the read-in head 16, moves with the work platform 12 in the linear direction of the arrow 27, to enable such storage of signals.

When the second and successive items are to be produced identically with the first item 13, the memory 22 is rotated about its axis in either the clockwise or the counterclockwise direction until the line of signals stored in said memory is under the read-out head 17. The head support 14, and thus the read-out head 17, moves with the work platform 12 in the linear direction of the arrow 27 and said read-out head reads out the stored signals in the memory 22 and controls the operation of the machine 11 in accordance with the read out signals to produce the second and successive items, identical to the first item.

Figure 3:
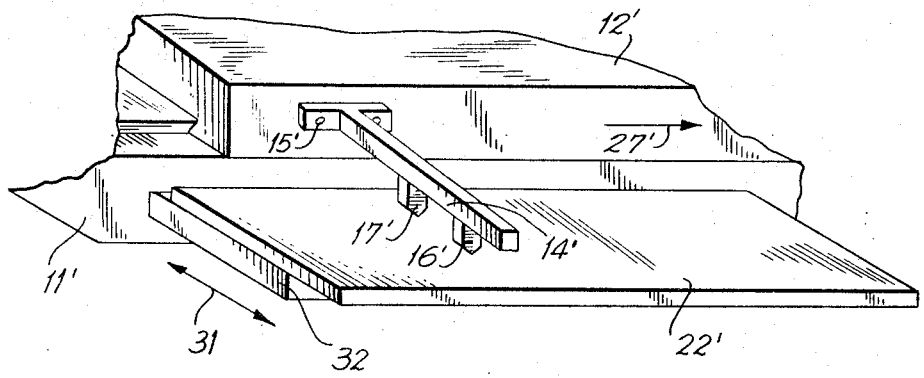
FIG. 3 is a perspective view of another embodiment of the memory system of the present invention.

In the embodiment of FIG. 3, a head support 14' is affixed to the work platform 12' in the same manner as the head support 14 of FIG. 1. The head support 14' is of linear configuration and supports a read-in head 16' and a read-out head 17' in spaced relation with each other.

The read-in and read-out heads 16' and 17' may be identical to the read-in and read-out heads 16 and 17 of FIG. 1 and are positioned in operative proximity with a magnetic memory 22'. The magnetic memory 22' is of planar configuration and may comprise any suitable magnetic memory or storage material. The magnetic memory 22' is mounted on the machine 11' for movement in the direction of the arrow 31 in a plane perpendicular to the direction of the movement of the work platform 12'.

The memory 22' is mounted on the machine 11' by any suitable mounting means such as, for example, a support ledge or support arms 32 affixed to said machine parallel to said memory and mounting said memory for movement in the direction of the arrow 31.

The work platform 12' of the machine 11' is moved in the direction of the arrow 27', during the operation of the machine. The read-in head 16' records or stores a signal in the memory 22' during the production of the first item (not shown in FIG. 3) in the same manner as does the head 16 in FIG. 1, with the head support 14' and said read-in head moving with the work platform as in FIG. 1.

When the second and successive items are to be produced identically with the first item, the memory 22' is moved toward the machine 11' until the line of signals stored in said memory is under the read-out head 17'. The read-out operation is then the same as in FIG. 1.

The memory system of the present invention obviates the need to move the item-supporting apparatus or chuck as required in the systems of the prior art. This is due to the fact that, instead of the item-supporting apparatus moving, either the memory cylinder 22 (FIG. 1) is rotated or the memory plate 22' (FIG. 3) is moved.

The memory cylinder 22 of FIG. 1 preferably has very little axial play, but the provision of such a cylinder is not difficult or expensive. Errors in the angle or amount of rotation of the memory cylinder 22 may cause a slight level variation, but do not affect the accuracy of the read-out signals.

If it is desired that there be an exactly localized or positioned stee pzero passage of the positive to negative voltage of the stored position signal, the magnetic memory 22 or 22' may be provided with three-part, transverse biasing traces, the direction of polarization of the center portion being opposite to the direction of polarization of the two outer portions. One or more three-part, transverse magnetic signal marks may be applied as a position signal in a direction of polarization opposite to the biasing trace. This type of magnetic signal storage is described in copending patent application Ser. No. 501,178, filed Oct. 22, 1965, and assigned to the assignee of the present applicants.

While the invention has been described by means of specific examples and in specific embodiments, we do not wish to be limited thereto, for obvious modifications will occur to those skilled in the art without departing from the spirit and scope of the invention.

We claim:

1. A memory system for controlling a machine having a stationary portion and a movable portion, said memory system comprising:

magnetic memory means movably mounted on the stationary portion of said machine;

head support means affixed to the movable portion of said machine and movable with said movable portion;

a read-in head mounted on said head support means in operative proximity with said magnetic memory means; and a read-out head mounted on said head support means in spaced relation from said read-in head in operative proximity with said magnetic memory means, said read-in and read-out heads being positioned in a plane perpendicular to the direction of movement of said movable portion of said machine and said magnetic memory means being movable relative to said read-in and read-out heads in said plane.

2. A memory system as claimed in claim 1, wherein said read-out head comprises a Hall device.

3. A memory system as claimed in claim 1, wherein said magnetic memory means comprises a substantially cylindrical drum rotatably mounted on the stationary portion of said machine for rotation about an axis parallel to the direction of movement of the movable portion of said machine.

4. A memory system as claimed in claim 1, wherein said magnetic memory means comprises a substantially planar plate movably mounted on the stationary portion of said machine for movement in a plane perpendicular to the direction of movement of the movable portion of said machine.

5. A memory system as claimed in claim 3, wherein said head support means is of substantially semiannular configuration.

6. A memory system as claimed in claim 4, wherein said head support means is of substantially linear configuration.

7. A method for controlling a machine having a stationary portion and a movable portion, said method comprising the steps of:

storing magnetic signals corresponding to operation and position of said machine in a line parallel to the direction of movement of the movable portion of said machine in a magnetic memory movably affixed to the stationary portion of said machine;

moving said magnetic memory relative to the stationary portion of said machine and in a plane perpendicular to the direction of movement of said movable portion of said machine upon completion of a first cycle of operation of said machine to change the distance of said line from said machine; and reading-out said magnetic signals from said line of said magnetic memory for a second and successive cycles of operation of said machine.

8. A method as claimed in claim 7, wherein the storing of said magnetic signals in said magnetic memory involves storing said magnetic signals in accordance with the movement of the movable portion of said machine.

References Cited

UNITED STATES PATENTS

| | | | |
|---|---|---|---|
| 2,939,287 | 6/1960 | Capron et al. | 346—33 |
| 2,988,237 | 6/1961 | Devol | 340—174.1 |
| 2,996,348 | 8/1961 | Rosenberg | 346—33 |
| 3,059,236 | 10/1962 | Marantette et al. | 346—33 |
| 3,251,039 | 5/1966 | Dupy et al. | 346—33 |

JAMES W. MOFFITT, *Primary Examiner.*

VINCENT P. CANNEY, *Assistant Examiner.*

U. S. Cl. X.R.

90—13; 346—33